(12) United States Patent
Bouchard et al.

(10) Patent No.: US 8,298,449 B2
(45) Date of Patent: *Oct. 30, 2012

(54) DIELECTRIC COMPOSITION WITH REDUCED RESISTANCE

(75) Inventors: Robert Joseph Bouchard, Wilmington, DE (US); Lap-Tak Andrew Cheng, Newark, DE (US); Kenneth Warren Hang, Hillsborough, NC (US); David Herbert Roach, Hockessin, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 293 days.

This patent is subject to a terminal disclaimer.

(21) Appl. No.: 12/836,150

(22) Filed: Jul. 14, 2010

(65) Prior Publication Data
US 2011/0006271 A1    Jan. 13, 2011

Related U.S. Application Data

(62) Division of application No. 10/475,212, filed as application No. PCT/US02/18398 on May 14, 2002, now Pat. No. 7,763,189.

(60) Provisional application No. 60/291,408, filed on May 16, 2001.

(51) Int. Cl.
*H01B 1/02* (2006.01)
*H01B 1/08* (2006.01)
*H01J 9/04* (2006.01)

(52) U.S. Cl. .................... 252/518.1; 252/520.1; 445/51
(58) Field of Classification Search .................. 252/500, 252/518.1, 520.1; 445/51
See application file for complete search history.

(56) References Cited

U.S. PATENT DOCUMENTS

| | | | |
|---|---|---|---|
| 3,673,117 A | 6/1972 | Schroeder et al. | |
| 3,723,175 A | 3/1973 | Masuyama et al. | |
| 4,333,861 A | 6/1982 | Aoki et al. | |
| 4,415,624 A | 11/1983 | Prabhu et al. | |
| 4,910,638 A | 3/1990 | Berghout et al. | |
| 5,096,619 A | 3/1992 | Slack | |
| 5,202,292 A | 4/1993 | Tanabe et al. | |
| 5,468,695 A | 11/1995 | Carroll et al. | |
| 5,491,118 A * | 2/1996 | Hormadaly | 501/20 |
| 5,820,843 A | 10/1998 | Yukinobu et al. | |
| 5,851,732 A * | 12/1998 | Kanda et al. | 430/321 |

(Continued)

FOREIGN PATENT DOCUMENTS

JP    2288106 A    11/1990

(Continued)

*Primary Examiner* — Mark Kopec
*Assistant Examiner* — Jaison Thomas

(57) ABSTRACT

This invention provides a dielectric composition comprising a dielectric which is fireable in air at a temperature in the range of about 450° C. to about 550° C. and a conductive oxide selected from the group consisting of antimony-doped tin oxide, tin-doped indium oxide, a transition metal oxide which has mixed valence states or will form mixed valence states after firing in a nitrogen atmosphere at a temperature in the range of about 450° C. to about 550° C. and normally conducting precious metal oxides such as ruthenium dioxide, wherein the amount of conductive oxide present is from about 0.25 wt % to about 25 wt % of the total weight of dielectric and conductive oxide. This dielectric composition has reduced electrical resistance and is useful in electron field emission devices to eliminate charging of the dielectric in the vicinity of the electron emitter and the effect of static charge induced field emission.

11 Claims, 2 Drawing Sheets

U.S. PATENT DOCUMENTS

| | | |
|---|---|---|
| 5,908,585 A | 6/1999 | Shibuta |
| 6,146,230 A * | 11/2000 | Kim et al. ............ 445/51 |
| 6,174,462 B1 | 1/2001 | Oka et al. |
| 6,214,754 B1 | 4/2001 | Stein |
| 6,242,860 B1 | 6/2001 | Sasao et al. |
| 7,214,466 B1 * | 5/2007 | Yang et al. ............ 430/198 |
| 2001/0031334 A1 | 10/2001 | Katsuda et al. |
| 2004/0144962 A1 | 7/2004 | Hayakawa et al. |
| 2005/0123431 A1 | 6/2005 | He |
| 2005/0229963 A1 | 10/2005 | He |
| 2006/0003152 A1 | 1/2006 | Youngs |
| 2006/0043345 A1 | 3/2006 | Tanaka et al. |
| 2007/0170053 A1 | 7/2007 | Ohashi et al. |

FOREIGN PATENT DOCUMENTS

| | | | |
|---|---|---|---|
| JP | 7235214 A | | 9/1995 |
| JP | 2004172250 A | | 6/2004 |
| JP | 2005122106 A | | 5/2005 |
| JP | 2005231961 A | | 9/2005 |
| JP | 2005302607 A | | 10/2005 |
| WO | 96/06438 | | 2/1996 |
| WO | WO 02/061791 | * | 8/2002 |

* cited by examiner

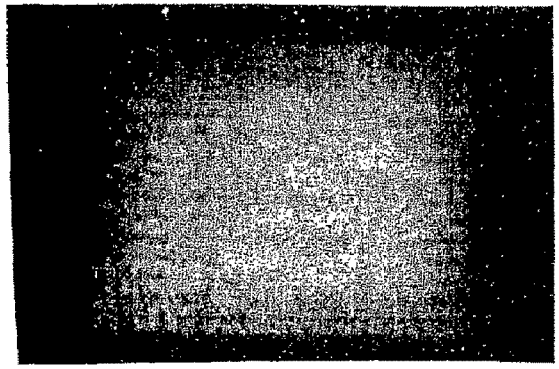
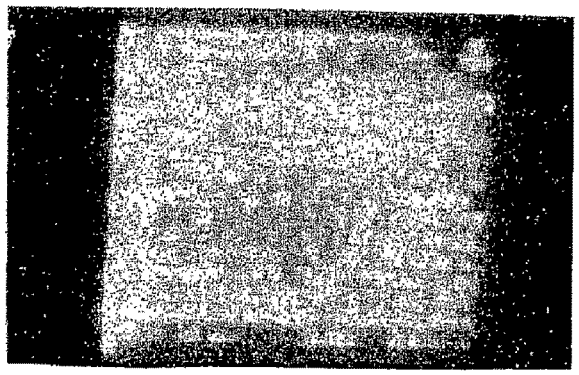
FIG. 2a          FIG. 2b
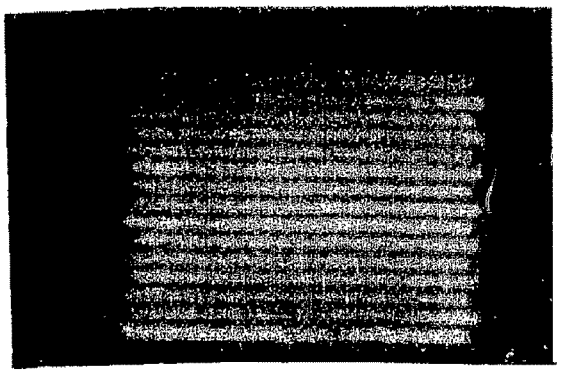
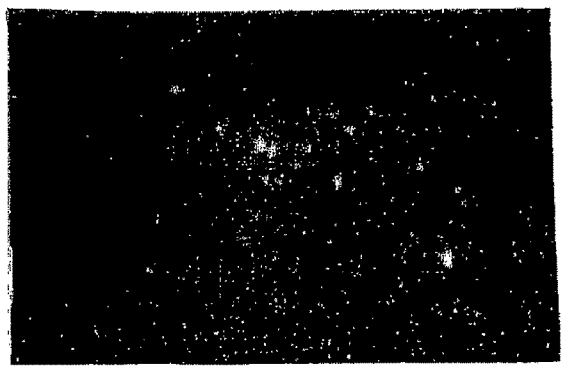
FIG. 3a          FIG. 3b

DIELECTRIC COMPOSITION WITH REDUCED RESISTANCE

This application is a division of, and claims the benefit under 35 U.S.C. §120 of, U.S. application Ser. No. 10/475,212, now U.S. Pat. No. 7,763,189, filed Apr. 22, 2004, which is the U.S. national stage application of International Application No. PCT/US02/18398, filed May 14, 2002, which claims the benefit of U.S. Provisional Application Ser. No. 60/291,408, filed May 16, 2001, all of which are hereby incorporated by reference in its entirety as a part hereof for all purposes.

FIELD OF THE INVENTION

This invention provides a dielectric composition with reduced electrical resistance that is useful in electron field emission devices to eliminate charging of the dielectric in the vicinity of the electron emitter and the effect of static charge induced field emission.

BACKGROUND OF THE INVENTION

In certain designs of cathode plates for field emission devices, e.g., field emission displays, the layout of the cathode surface may require the emitter lines to be bordered by or in close proximity to electrically insolating dielectric surfaces. During field emission, these neighboring dielectric surfaces are bombarded by high energy electrons with shallow angle of incidence. As a result, secondary electron emission may occur from the dielectric surface leaving behind static positive charges. These positively charged surfaces, being only a short distance away from the emitter, will exert a large positive electric field on the emitter resulting in even stronger emission in the direction of the dielectric surfaces. This effect is therefore self-enhancing and will dominate any gate or anode control. Since the static charge continues to build with time, uncontrollable charging induced emission can occur even at very low continuous anode voltage. This problem severely limits the anode voltage. One solution would be to change the cathode layout that may minimize this charging effect. A preferred solution is to develop a single or multilayer dielectric system that does not charge up as a result of having a low secondary emission characteristic or effectively dissipating the charge as the electric field increases.

SUMMARY OF THE INVENTION

This invention provides a dielectric composition comprising a dielectric and a conductive oxide, wherein the dielectric is fireable in air at a temperature in the range of about 450° C. to about 550° C. and the conductive oxide is selected from the group consisting of antimony-doped tin oxide, tin-doped indium oxide, a transition metal oxide which has mixed valence states or will form mixed valence states after firing in a nitrogen atmosphere at a temperature in the range of about 450° C. to about 550° C. and conducting precious metal oxides such as ruthenium dioxide. The amount of conductive oxide present is from about 0.25 wt % to about 25 wt % of the total weight of dielectric and conductive oxide and preferably from about 0.5 wt % to about 15 wt %. The dielectric composition must be capable of being fired in nitrogen after first being fired in air in order to be compatible with the treatment necessary in forming an electron emitter cathode assembly.

This invention also provides a paste for screen printing a dielectric composition comprising a dielectric and a conductive oxide, wherein the dielectric is fireable in air at a temperature in the range of about 450° C. to about 550° C. and the conductive oxide is selected from the group consisting of antimony-doped tin oxide, tin-doped indium oxide, a transition metal oxide which has mixed valence states or will form mixed valence states after firing in a nitrogen atmosphere at a temperature in the range of about 450° C. to about 550° C. and conducting precious metal oxides such as ruthenium dioxide. The amount of conductive oxide present is from about 0.25 wt % to about 25 wt % of the total weight of dielectric and conductive oxide and preferably from about 0.5 wt % to about 15 wt %.

Such dielectric compositions have reduced resistances and are useful in field emission devices.

There is also provided a preferred dielectric for use in the dielectric composition of the invention. This dielectric is a solid solution comprised of about 1 to about 26 wt % $SiO_2$, about 0.5 to about 6 wt % $Al_2O_3$, about 6 to about 24 wt % $B_2O_3$, about 2 to about 24 wt % ZnO, about 0.1 to about 5 wt % $Na_2O$ and about 20 to about 75 wt % $Bi_2O_3$. Preferably, the solid solution is comprised of about 1 to about 9 wt % $SiO_2$, about 0.6 to about 6 wt % $Al_2O_3$, about 6 to about 14 w % $B_2O_3$, about 2 to about 13 wt % ZnO, about 0.1 to about 2 wt % $Na_2O$ and about 65 to about 72 wt % $Bi_2O_3$. More preferably, the solid solution is comprised of about 2 wt % $SiO_2$, about 3 wt % $Al_2O_3$, about 13 wt % $B_2O_3$, about 9 wt % ZnO, about 1 wt % $Na_2O$ and about 72 wt % $Bi_2O_3$.

The preferred conductive oxide is antimony-doped tin oxide.

BRIEF DESCRIPTION OF THE DRAWINGS

FIG. 2 shows the emission results obtained with the sample of Comparative Experiment A.

FIG. 3 shows the emission results obtained with the sample of Example 5.

DETAILED DESCRIPTION OF THE INVENTION

Figure 1:
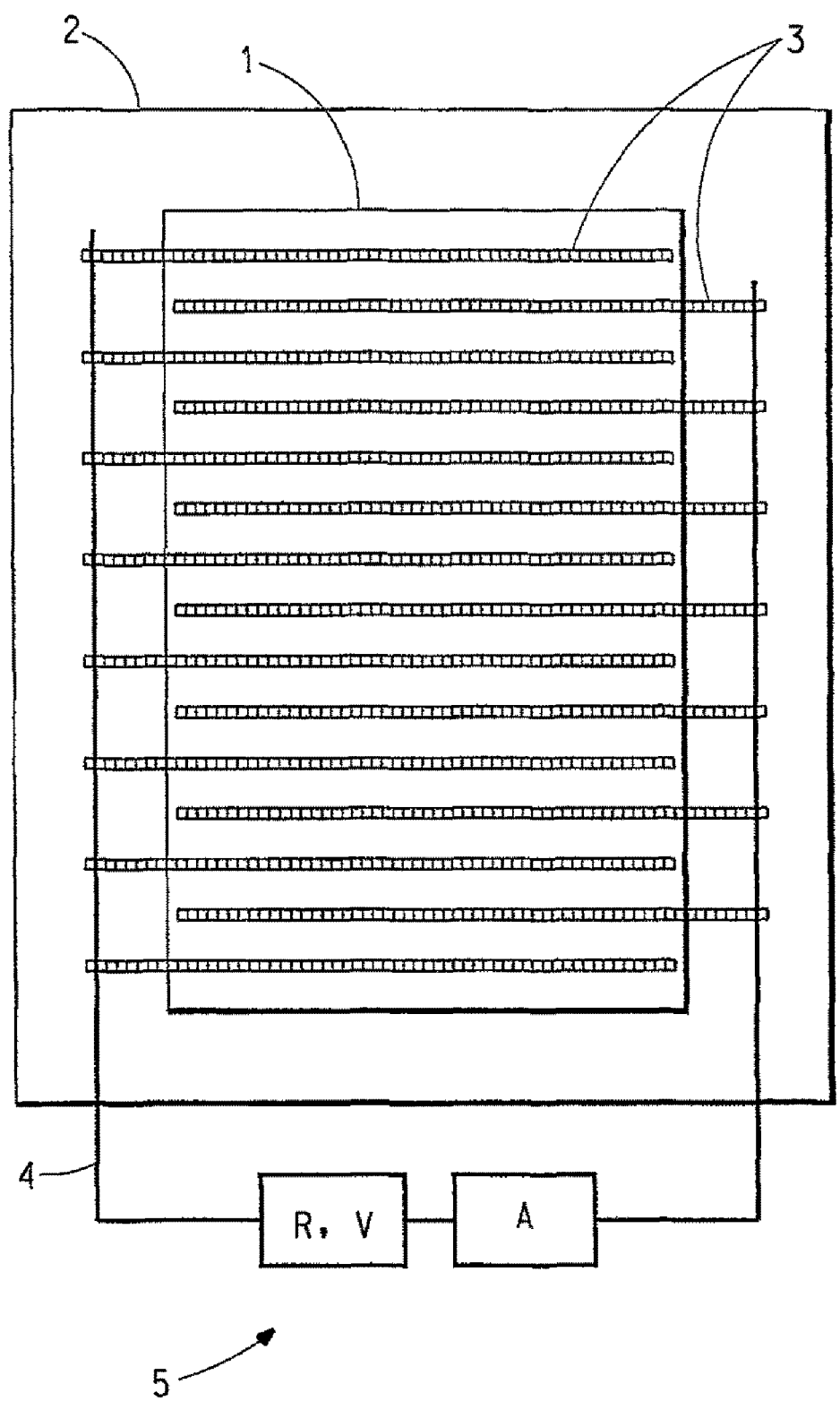
FIG. 1 is a schematic drawing of the electron emitter configuration used in Examples 5-1 and Comparative Experiments A-C.

The present invention provides a dielectric composition with reduced resistance to reduce or eliminate the charge buildup on the dielectric by introducing a small amount of semiconducting or metallic material. At some concentration of the semiconducting or metallic material, the resistance will drop to the range which is low enough to allow effective static charge dissipation at high fields while still providing the required insulating properties to prevent shorting between adjacent emitter lines or dots. Such a dielectric composition may serve as the entire dielectric or may also be used as a top layer in a multilayer dielectric system which provide good cross layer insulation and effective surface charge dissipation.

The dielectric composition provided by this invention comprises a dielectric which is fireable at a temperature in the range of about 450° C. to about 550° C. and a conductive oxide selected from the group consisting of antimony-doped tin oxide, tin-doped indium oxide, a transition metal oxide which has mixed valence states or will form mixed valence states after firing in a nitrogen atmosphere at a temperature in the range of about 450° C. to about 550° C. and normally conducting precious metal oxides such as ruthenium dioxide. The amount of conductive oxide present is from about 0.25 wt % to about 25 wt % of the total weight of dielectric and conductive oxide and preferably from about 0.5 wt % to about 15 wt %. The optimum amount of conductive oxide required to achieve the desired resistivity will vary depending upon the particular conductor used and its state of dispersion. The desired resistivity of the dielectric composition will depend on the particular configuration of the emitter, i.e., the size of the emitter lines or dots and the separation of the emitter lines or dots. The amount of conductive oxide can be adjusted to the particular configuration used.

The paste for screen printing the dielectric composition of the invention will typically contain the dielectric powder, the conductive oxide, an organic medium, solvent, and surfactant. The role of the medium and solvent is to suspend and disperse the particulate constituents, i.e., the solids, in the paste with a proper rheology for typical patterning processes such as screen printing. There are a large number of such mediums known in the art. Examples of resins that can be used are cellulosic resins such as ethyl cellulose and alkyd resins of various molecular weights. Butyl carbitol, butyl carbitol acetate, dibutyl carbitol, dibutyl phthalate and terpineol are examples of useful solvents. These and other solvents are formulated to obtain the desired viscosity and volatility requirements. A surfactant can be used to improve the dispersion of the particles. Organic acids such oleic and stearic acids and organic phosphates such as lecithin or Gafac® phosphates are typical surfactants. If the screen-printed paste is to be photopatterned, the paste contains a photoinitiator, a developable binder and a photohardenable monomer comprised, for example, of at least one addition polymerizable ethylenically unsaturated compound having at least one screen printing typically contains the dielectric frit and the conductive oxide, an organic medium, solvent and surfactant.

The frit used in pastes for screen printing dielectrics is typically an appropriate mixture of oxides. As is well known to those skilled in the art, inert fillers can be added to the frit to modify some of the properties, e.g., flow characteristics of the frit, strength of the fired composition, temperature coefficient of expansion, etc. All such pastes and the resulting fired dielectric compositions can contain 0-35 wt % of inorganic filler. Typical examples of such filler are alumina, silica, calcium zirconate and zircon. For the purposes herein, dielectric means all of the dielectric including any filler present.

The preferred dielectric frit for use in pastes to screen print the dielectric compositions of the invention is comprised of about 1 to about 26 wt % $SiO_2$, about 0.5 to about 6 wt % $Al_2O_3$, about 6 to about 24 w % $B_2O_3$, about 2 to about 24 wt % ZnO, about 0.1 to about 5 wt % $Na_2O$ and about 20 to about 75 wt % $Bi_2O_3$. More preferably, the dielectric frit is comprised of about 1 to about 9 wt % $SiO_2$, about 0.6 to about 6 wt % $Al_2O_3$, about 6 to about 14 w % $B_2O_3$, about 2 to about 13 wt % ZnO, about 0.1 to about 2 wt % $Na_2O$ and about 65 to about 72 wt % $Bi_2O_3$. Most preferably, the dielectric frit is comprised of about 2 wt % $SiO_2$, about 3 wt % $Al_2O_3$, about 13 wt % $B_2O_3$, about 9 wt % ZnO, about 1 wt % $Na_2O$ and about 72 wt % $Bi_2O_3$.

After firing, this paste provides a dielectric which s a solid solution of $SiO_2$, $Al_2O_3$, $B_2O_3$, ZnO, $Na_2O$ and $Bi_2O_3$ with the above ratio weight percent.

EXAMPLES OF THE INVENTION

Examples 1-4

The purpose of these Examples was to compare various conductive oxides for the dielectric composition.

Four pastes were prepared using a bismuth-based dielectric frit and $Cr_2O_3$, $V_2O_5$, $V_2O_3$, and $SnO_2$:Sb. The first three oxides were standard powder reagents. The antimony doped tin oxide, $SnO_2$:Sb, was Zelec® ECP 3010-XC, which can be obtained from E.I. du Pont de Nemours and Company, Wilmington, Del.

The bismuth-based frit used in these Examples, Bi-frit, has the composition shown in Table I:

TABLE I

| Ingredient | Wt % |
|---|---|
| $Bi_2O_3$ | 71.8 |
| $B_2O_3$ | 13.2 |
| ZnO | 9.0 |
| Al2O3 | 3.0 |
| SiO2 | 2.0 |
| Na2O | 1.0 |

The four pastes were prepared with the compositions shown in Table II:

TABLE II

| Ingredient | Example 1 Wt % | Example. 2 Wt % | Example 3. Wt % | Example 4 Wt % |
|---|---|---|---|---|
| Bi-frit | 66.0 | 66.0 | 66.0 | 66.0 |
| $SnO_2$:Sb | 16.5 | None | None | None |
| $Cr_2O_3$ | None | 16.5 | None | None |
| $V_2O_5$ | None | None | 16.5 | None |
| $V_2O_3$ | None | None | None | 16.5 |
| Vehicle | 16.4 | 16.4 | 16.4 | 16.4 |
| Surfactant | 0.6 | 0.6 | 0.6 | 0.6 |
| Pigment | 0.5 | 0.5 | 0.5 | 0.5 |

The vehicle is a standard thick film paste ingredient consisting of a mixture of 10% ethylcellulose in a beta terpineol solvent. The surfactant is an organophosphate, Gafac RE-610. The pigment is standard pigment grade cobalt aluminate.

Each of the four pastes were printed onto a glass slide in the form a pad 0.25 inch (0.6 cm) by 1 inch (2.5 cm). Each pad was about 10 µm thick. Silver electrodes were screen printed onto each pad to measure the resistance using a silver paste composition 7095 available from E.I. du Pont de Nemours and Company, Wilmington, Del. The gap between the silver electrodes over which the resistance was measured was about 1 mm. The resistance of each sample was measured after firing in air at 525° C. and then after firing in nitrogen at 510° C. The electrical properties of the four fired pastes are shown in Table III below:

TABLE III

| | Air Fired | Nitrogen Fired |
|---|---|---|
| Example 1 | 1.2 MΩ | 0.9 MΩ |
| Example 2 | >1 GΩ | >1 GΩ |
| Example 3 | 540 MΩ | 7 MΩ |
| Example 4 | 15 MΩ | 23 MΩ |

All of the conductive oxides reduced the resistance of the dielectric. $SnO_2$:Sb showed the largest reduction after firing in air and the least change after undergoing the second firing in nitrogen.

Examples 5-11

Comparative Experiments A-C

These Examples and Comparative Experiments show the effects of various amounts of the conductive oxide $SnO_2$:Sb in eliminating the charging of the dielectric and the resulting undesirable electron emission.

The paste of Example 1 was blended with a paste with the composition shown in Table IV:

TABLE IV

| Ingredient | Wt % |
| --- | --- |
| Bi-frit | 70.0 |
| $SnO_2$:Sb | None |
| Vehicle | 29.0 |
| Surfactant | 0.5 |
| Pigment | 0.5 | where the Bi-frit, vehicle, surfactant and pigment are identical to those used for the paste of Example 1. Ten different pastes were formed with $SnO_2$:Sb content ranging from 0 to 10 wt % based on the total weight of the paste. The $SnO_2$:Sb content of each Example and Comparative Experiment is shown in Table V below:

TABLE V

| Ingredient Example or Comp. Exp. | $SnO_2$:Sb | wt % Resistance | Charging |
| --- | --- | --- | --- |
| A | 0 | >200 GΩ | Extensive |
| B | 2 | >200 GΩ | Extensive |
| C | 3 | ~200 GΩ | Some |
| 5 | 3.5 | 152 GΩ | None@3 kV |
| 6 | 3.75 | 52 GΩ | None@3 kV |
| 7 | 4 | 3.3 GΩ | None@3 kV |
| 8 | 4.25 | 236 MΩ | None@3 kV |
| 9 | 4.5 | 79 MΩ | None@3 kV |
| 10 | 5 | 33 MΩ | None@3 kV |
| 11 | 10 | 136 kΩ | None@3 kV |

The dielectric composition of each of the Examples and Comparative Experiments was printed in 0.75" (1.9 cm) square pad 1 on a glass slide 2 as shown in FIG. 1. The dielectric composition was then fired in air at 525° C. A test pattern consisting of 15 bars 3, 20 mil (0.51 mm) wide with 20 mil (0.51 mm) spaces between bars was screen printed over the dielectric composition. The bars consisted of silver paste screen printed and then fired at 525° C. in air and emitter paste is subsequently screen printed on top of the silver lines and fired at 510° C. in nitrogen. The silver paste was a composition 7095 available from E.I. du Pont de Nemours and Company, Wilmington, Del. The emitter paste for these Examples was prepared by mixing three components: one a suspension containing single wall carbon nanotubes, one a typical organic medium containing 10% ethylcellulose and 90% beta-terpineol, and one a typical paste containing silver. Laser ablation grown single wall carbon nanotubes were obtained from Tubes @ Rice, Rice University, Houston, Tex. as an unpurified powder produced by laser ablation. A nanotube suspension was prepared by sonicating, i.e. by mixing ultrasonically, a mixture containing 1% by weight of the nanotube powder and 99% by weight of trimethylbenzene. The ultrasonic mixer used was a Dukane Model 92196 with a ¼ inch horn operating at 40 kHz and 20 watts. The emitter paste was prepared by combining the nanotube suspension/organic medium/silver pastes in the ratios by weight of 27/40/33. The combination was mixed in a three-roll mill for ten passes to form the emitter paste.

Alternate bars are connected electrically as indicated 4. A resistance value for the dielectric composition can be determined with an electrometer 5 for this particular line pattern. The data show that the conductive oxide starts to take effect for this configuration when the concentration in the paste is ~3% and the resistance decreases to ~200 GΩ. Resistances for all the Examples and Comparative Experiments are shown in Table V.

Field emission tests were carried out for all the Examples and Comparative Experiments using a flat-plate emission measurement unit comprised of two electrodes, one serving as the anode or collector and the other serving as the cathode. The cathode consists of a copper block mounted in a polytetrafluoroethylene (PTFE) holder. The copper block is recessed in a 1 inch by 1 inch (2.5 cm×2.5 cm) area of PTFE and the sample substrate is mounted to the copper block with electrical contact being made between the copper block and the sample substrate by means of copper tape. A high voltage lead is attached to the copper block. The anode is held parallel to the sample at a distance, which can be varied, but once chosen it was held fixed for a given set of measurements on a sample. A spacing of 1.25 mm was used. The anode consists of a glass plate coated with indium tin oxide deposited by chemical vapor deposition. It is then coated with a standard ZnS-based phosphor, Phosphor P-31, Type 139 obtained from Electronic Space Products International. An electrode is attached to the indium tin oxide coating. The test apparatus is inserted into a vacuum system, and the system was evacuated to a base pressure below $1\times10^{-5}$ torr ($1.3\times10^{-3}$ Pa). A negative voltage pulse with typical pulse width of 3 μsec at a frequency of 60 Hz can applied to the cathode or a constant voltage can be applied. The image emitted by the phosphor as a result of the emission current is recorded with a camera.

The charging problem during field emission and the significant improvement with the dielectric compositions of this invention can be demonstrated using these samples. As a control, the emitter cell of Comparative Experiment A which contains no SnO2:Sb filler was studied with both pulsed and constant anode voltage. FIG. 2a shows the diode emission image when high voltage pulses of 3 μsec duration were applied across the anode-cathode gap at 60 Hz. The onset of charging induced emission, which can be seen as bright patches in FIG. 2a, was observed at 2 kV. The bright patches spread rapidly with time and the charging induced emission became uncontrollable within a few seconds of its onset. When a continuous anode voltage was applied, charging induced emission occurred at an anode voltage of 1 kV as shown in FIG. 2b. FIGS. 3a and 3b demonstrate the effectiveness of using a dielectric composition of this invention to eliminate charging during field emission. When the same diode emission tests were conducted with the emitter cell of Example 5 which contains 3.5% SnO2:Sb, no charging induced emission was observed at pulse anode voltage of 3 kV and continuous anode voltage of 1.5 kV as shown in FIGS. 3a and 3b, respectively.

What is claimed is:

1. A dielectric composition comprising a dielectric and a conductive oxide, wherein (a) said dielectric is a solid solution comprised of about 1 to about 26 wt % $SiO_2$, about 0.5 to about 6 wt % $Al_2O_3$, about 6 to about 24 wt % $B_2O_3$, about 2 to about 24 wt % ZnO, about 0.1 to about 5 wt % $Na_2O$ and about 20 to about 75 wt % $Bi_2O_3$ and said dielectric is fireable in air at a temperature in the range of about 450° C. to about 550° C.; (b) said conductive oxide is selected from the group consisting of
 (i) tin-doped indium oxide,
 (ii) a transition metal oxide which has mixed valence states or will form mixed valence states after firing in a nitrogen atmosphere at a temperature in the range of about 450° C. to about 550° C., and
 (iii) conducting precious metal oxides; and the amount of said conductive oxide present is from about 0.25 wt % to about 25 wt % of the total weight of said dielectric and said conductive oxide.

2. The dielectric composition of claim wherein said dielectric is a solid solution comprised of about 1 to about 9 wt % SiO2, about 0.6 to about 6 wt % $Al_2O_3$, about 6 to about 14 wt % $B_2O_3$, about 2 to about 13 wt % ZnO, about 0.1 to about 2 wt % $Na_2O$ and about 65 to about 72 wt % $Bi_2O_3$.

3. The dielectric composition of claim 1 wherein said dielectric is a solid solution comprised of about 2 wt % $SiO_2$, about 3 wt % $Al_2O_3$, about 13 wt % $B_2O_3$, about 9 wt % ZnO, about 1 wt % $Na_2O$ and about 72 wt % $Bi_2O_3$.

4. A paste for screen printing a dielectric composition, comprising a dielectric and a conductive oxide, wherein (a) said dielectric is a solid solution comprised of about 1 to about 26 wt % $SiO_2$, about 0.5 to about 6 wt % $Al_2O_3$, about 6 to about 24 wt % $B_2O_3$, about 2 to about 24 wt % ZnO, about 0.1 to about 5 wt % $Na_2O$ and about 20 to about 75 wt % $Bi_2O_3$ and said dielectric is fireable in air at a temperature in the range of about 450° C. to about 550° C.; (b) said conductive oxide is selected from the group consisting of
 (i) tin-doped indium oxide,
 (ii) a transition metal oxide which has mixed valence states or will form mixed valence states after firing in a nitrogen atmosphere at a temperature in the range of about 450° C. to about 550° C. and
 (iii) conducting precious metal oxides; and
 the amount of said conductive oxide present is from about 0.25 wt % to about 25 wt % of the total weight of said dielectric and said conductive oxide.

5. The paste of claim 4 wherein said dielectric is a solid solution comprised of about 1 to about 9 wt % $SiO_2$, about 0.6 to about 6 wt % $Al_2O_3$, about 6 to about 14 wt % $B_2O_3$, about 2 to about 13 wt % ZnO, about 0.1 to about 2 wt % $Na_2O$ and about 65 to about 72 wt % $Bi_2O_3$.

6. The paste of claim 4 wherein said dielectric is a solid solution comprised of about 2 wt % $SiO_2$, about 3 wt % $Al_2O_3$, about 13 wt % $B_2O_3$, about 9 wt % ZnO, about 1 wt % $Na_2O$ and about 72 wt % $Bi_2O_3$.

7. The paste of claim 6 wherein said paste can be photo-patterned.

8. The paste of claim 4 wherein said paste can be photo-patterned.

9. An electron field emission device using a dielectric composition comprising a dielectric and a conductive oxide, wherein (a) said dielectric is a solid solution comprised of about 1 to about 26 wt % $SiO_2$, about 0.5 to about 6 wt % $Al_2O_3$, about 6 to about 24 wt % $B_2O_3$, about 2 to about 24 wt % ZnO, about 0.1 to about 5 wt % $Na_2O$ and about 20 to about 75 wt % $Bi_2O_3$ and said dielectric is fireable in air at a temperature in the range of about 450° C. to about 550° C.; (b) said conductive oxide is chosen from the group consisting of
 (i) tin-doped indium oxide,
 (ii) a transition metal oxide which has mixed valence states or will form mixed valence states after firing in a nitrogen atmosphere at a temperature in the range of about 450° C. to about 550° C. and
 (iii) conducting precious metal oxides; and
 the amount of said conductive oxide present is from about 0.25 wt % to about 25 wt % of the total weight of said dielectric and said conductive oxide.

10. The electron field emission device of claim 9 wherein said dielectric is a solid solution comprised of about 1 to about 9 wt % $SiO_2$, about 0.6 to about 6 wt % $Al_2O_3$, about 6 to about 14 wt % $B_2O_3$, about 2 to about 13 wt % ZnO, about 0.1 to about 2 wt % $Na_2O$ and about 65 to about 72 wt % $Bi_2O_3$.

11. The electron field emission device of claim 9 wherein said dielectric is a solid solution is comprised of about 2 wt % $SiO_2$, about 3 wt % $Al_2O_3$, about 13 wt % $B_2O_3$, about 9 wt % ZnO, about 1 wt % $Na_2O$ and about 72 wt % $Bi_2O_3$.

* * * * *

UNITED STATES PATENT AND TRADEMARK OFFICE
CERTIFICATE OF CORRECTION

| | |
|---|---|
| PATENT NO. | : 8,298,449 B2 |
| APPLICATION NO. | : 12/836150 |
| DATED | : October 30, 2012 |
| INVENTOR(S) | : Robert Joseph Bouchard et al. |

Page 1 of 1

It is certified that error appears in the above-identified patent and that said Letters Patent is hereby corrected as shown below:

In the Claims:

Column 7, Claim 2, Line 1, please insert the number -- 1 -- after the word -- claim --.

Column 8, Claim 11, Line 2, please delete the second occurrence of the word "is" after the word -- solution. --.

Signed and Sealed this
Eighteenth Day of June, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,298,449 B2  
APPLICATION NO. : 12/836150  
DATED : October 30, 2012  
INVENTOR(S) : Robert Joseph Bouchard et al.

It is certified that error appears in the above-identified patent and that said Letters Patent is hereby corrected as shown below:

In the Claims:

Column 7, Line 4 (Claim 2, Line 1) please insert the number -- 1 -- after the word -- claim --.

Column 8, Line 33 (Claim 11, Line 2) please delete the second occurrence of the word "is" after the word -- solution. --.

This certificate supersedes the Certificate of Correction issued June 18, 2013.

Signed and Sealed this  
Sixteenth Day of July, 2013

Teresa Stanek Rea  
*Acting Director of the United States Patent and Trademark Office*